(12) United States Patent
Podowski

(10) Patent No.: US 7,039,509 B2
(45) Date of Patent: May 2, 2006

(54) WIRELESS SUPPLEMENT AND/OR SUBSTITUTE FOR AIRCRAFT FLIGHT RECORDERS

(75) Inventor: Robert Richard Podowski, Mundelein, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 73 days.

(21) Appl. No.: 10/331,258

(22) Filed: Dec. 30, 2002

(65) Prior Publication Data

US 2004/0128039 A1 Jul. 1, 2004

(51) Int. Cl.
*G06F 19/00* (2006.01)

(52) U.S. Cl. .............. 701/35; 701/3; 701/120

(58) Field of Classification Search ......... 701/35, 701/3, 11, 14, 120; 455/430, 431; 244/118.5, 244/75 R, 117 R; 340/945, 574, 573.1, 963, 340/960; 370/468; 348/193
See application file for complete search history.

(56) References Cited

U.S. PATENT DOCUMENTS

| | | | | |
|---|---|---|---|---|
| 4,306,116 A | * | 12/1981 | McClure et al. | 379/28 |
| 5,235,634 A | * | 8/1993 | Oliver | 379/106.06 |
| 5,890,079 A | * | 3/1999 | Levine | 701/14 |
| 6,058,288 A | * | 5/2000 | Reed et al. | 455/3.06 |
| 6,154,636 A | * | 11/2000 | Wright et al. | 455/66.1 |
| 6,154,637 A | * | 11/2000 | Wright et al. | 455/66.1 |
| 6,295,449 B1 | * | 9/2001 | Westerlage et al. | 455/422.1 |
| 6,385,513 B1 | * | 5/2002 | Murray et al. | 701/14 |
| 6,449,287 B1 | * | 9/2002 | Leuca et al. | 370/468 |
| 6,788,935 B1 | * | 9/2004 | McKenna et al. | 455/431 |
| 2002/0013150 A1 | * | 1/2002 | McKenna et al. | 455/430 |
| 2002/0111165 A1 | * | 8/2002 | Jensen et al. | 455/430 |
| 2003/0065428 A1 | * | 4/2003 | Mendelson et al. | 701/9 |
| 2003/0135311 A1 | * | 7/2003 | Levine | 701/35 |
| 2003/0169335 A1 | * | 9/2003 | Monroe | 348/143 |
| 2004/0079837 A1 | * | 4/2004 | Nelson | 244/118.5 |

* cited by examiner

Primary Examiner—Thomas G. Black
Assistant Examiner—Christine M. Behncke

(57) ABSTRACT

A method for preserving information from an airborne aircraft (10) includes receiving an activation signal, and in response thereto, establishing a call from the aircraft (10) to a ground support facility (210) over a wireless telecommunications network (200). Sounds within the aircraft (10) are monitored, and an audio signal reflecting the same is generated. Flight data from the aircraft (10) is obtained and encoded. The audio signal and encoded flight data are multiplexed to generate a combined output signal (300) which is transmitted via the call from the aircraft (10) to the ground support facility (210).

9 Claims, 3 Drawing Sheets

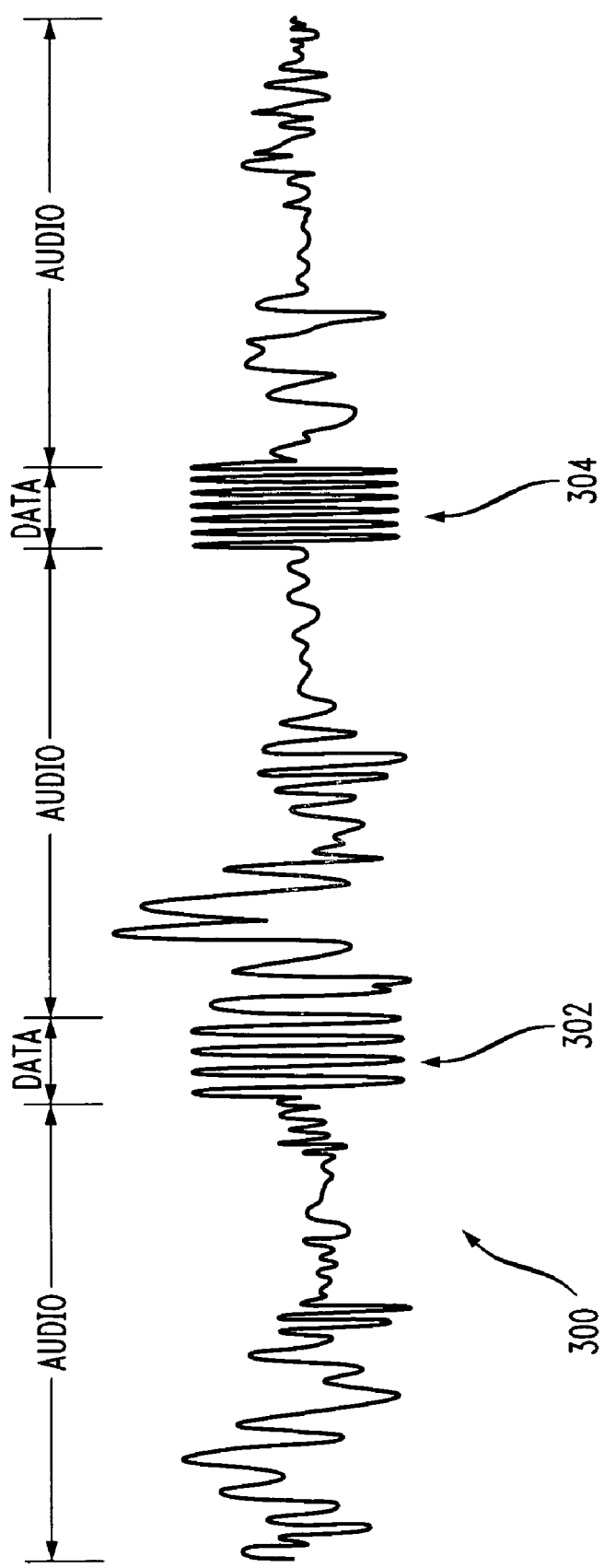

WIRELESS SUPPLEMENT AND/OR SUBSTITUTE FOR AIRCRAFT FLIGHT RECORDERS

FIELD

The present invention relates to the art of wireless communications and aviation. It finds particular application in conjunction with wireless telecommunications networks and aircraft, and will be described with particular reference thereto. However, it is to be appreciated that the present invention is also amenable to other like applications.

BACKGROUND

Aircraft, and in particular commercial aircraft, are often equipped with what is commonly known as a flight recorder (FR). A typical FR may include a cockpit voice recorder (CVR), a flight data recorder (FDR), or a combination of both. When activated, the CVR records and stores or otherwise captures the cockpit voices, sounds and/or audio information. This may include, but is not limited to, sounds and audio material or information occurring within the cockpit, the voices and/or conversations of cockpit personnel (e.g., the flight crew or the like), and/or the voices and/or conversations of other personnel in communication with the aircraft (e.g., the ground crew, air traffic controllers, other control tower personnel, etc.). Similarly, when activated, the FDR records and stores or otherwise captures flight data regarding the aircraft and/or its environment. Exemplary flight data includes, but is not limited to, the aircraft's: tail number (e.g., it may be assigned by the International Civil Aviation Organization (ICAO)), position (i.e., latitude and longitude), altitude, attitude, trajectory, air speed, yaw, lift, decent or climb rate, acceleration, fuel level and/or consumption, flap and/or throttle positions, flight and/or other instrument readings, engine function data, cabin pressure, experienced weather conditions, etc.

The information acquired by the FR is often used to gain an understanding of or recreate the circumstances surrounding an undesirable event experienced by or on the aircraft, such as, collisions, crashes, hijackings or other calamities. For example, through analysis of the FR information it is often sought to determine the precise cause or origin of the undesirable event, be it aircraft failure, pilot error, security breach, bomb or otherwise, so that appropriate remedial actions may be taken to prevent the undesirable event from occurring again in the future.

While generally useful, FRs have some limitations. For example, the FR and/or the information captured thereby are typically stored in what is commonly known as a "black box" situated in the aircraft. The black box, while intended to be indestructible, can still be damaged, particularly in extreme environments and conditions as may be experienced in connection with explosions, aircraft collisions, crashes, etc. Further, the black box may become lost or otherwise irretrievable, e.g., in the case of a deep sea crash or a crash in a remote or inaccessible geographic location. Accordingly, whether the black box is damaged or irretrievable, the desired information stored therein may be either partially or wholly lost. This can be an undesirable result.

Additionally, even when the black box is recovered completely intact, the information therein can only be used in hindsight some time after the undesirable event has taken place. For example, in the case of an aircraft crashing in a remote geographic location, it may take considerable time to locate and recover the black box from its crash location, transport it to a location suitable to extract the information therefrom, extract the information, analyze the information, and recreate the circumstances of the event from the information. By the time the circumstances surrounding the undesirable event are recreated, a significant amount of time may have lapsed since the event occurred. Again, this can be an undesirable result. It is particularly objectionable when the consequents of the event itself or other undesirable events occurring shortly thereafter may have otherwise been avoided or alleviated had the information been earlier available. For example, real time or early availability of the information may be desirable in hijacking cases so that it may be used to remedy or diffuse the situation as it is occurring, or to avoid or alleviate the consequences of a second or subsequent hijacking closely coordinated in time with the first.

Certain constraints are imposed on the FR insomuch as it is situated aboard the aircraft and/or housed in the black box having limited physical dimensions. Due to these constraints or otherwise, often, FRs have a limited capacity for information storage, e.g., 30 minutes worth of information. Commonly, the FR remains active for the entire flight of the aircraft, with the information being recorded in a looped fashion so that the most current information is being stored while the oldest information is overwritten or erased to make room for newer information. Accordingly, only the last limited time period is saved on the FR, e.g., the last 30 minutes worth of information. Information occurring prior to this time period is unavailable. Again, this can be an undesirable result.

The present invention contemplates a new and improved method and/or system for use in conjunction with or in lieu of FRs which overcomes the above-referenced problems and others.

SUMMARY

In accordance with an aspect of the present invention, a method for preserving information from an airborne aircraft includes: receiving an activation signal; establishing a call from the aircraft to a ground support facility over a wireless telecommunications network in response to the activation signal; monitoring sounds within the aircraft; generating an audio signal in response to the monitored sounds; obtaining flight data from the aircraft; encoding the flight data; multiplexing the audio signal and encoded flight data to generate a combined output signal; and, transmitting the output signal via the call from the aircraft to the ground support facility.

In accordance with another aspect of the present invention, a system for preserving information from an airborne aircraft is provided. The system includes control means for controlling the system. The control means activate the system in response to an activation signal. Detecting means monitor sounds within the aircraft and generate an audio signal in response thereto. Acquiring means obtain flight data from the aircraft, and an encoder encodes the same. The audio signal and encoded flight data are combined by combining means to generate a combined output signal. Communication means establish a connection with a ground support facility over a wireless telecommunications network when the system is activated. The combined output signal is transmitted to the ground support facility via the established connection.

In accordance with yet another aspect of the present invention, a method of transmitting information from an aircraft to a desired destination is provided. The method includes obtaining information from aboard the aircraft. The information includes at least one of an audio signal and/or flight data. At least one call between the aircraft and the desired destination is established over a cellular telecommunications network, and the obtained information is transmitted to the desired destination via the at least one call.

One advantage of the present invention is the ability to provide substantially real time cockpit voice and flight data from an in flight aircraft to ground facilities.

Another advantage of the present invention is the ability to guard against the loss of cockpit voice and flight data from an in flight aircraft.

Yet another advantage of the present advantage is the ability to efficiently and securely transmit cockpit voice and flight data from an in flight aircraft to ground facilities.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

FIG. 3 shows a portion of an exemplary signal format used by the EAGITS of FIGS. 1 and 2.

DETAILED DESCRIPTION OF PREFERRED EMBODIMENTS

Figure 1:
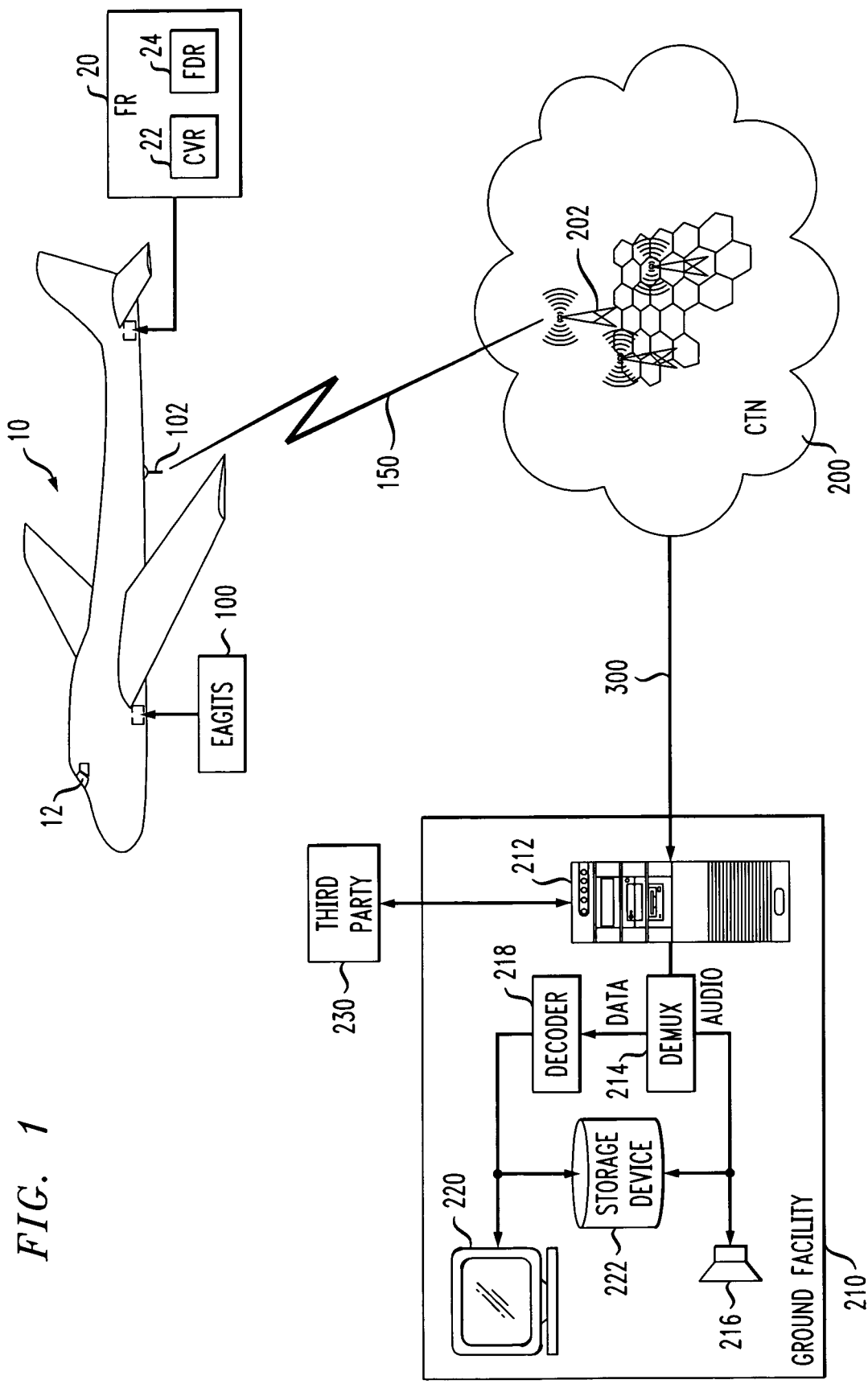
FIG. 1 is a diagrammatic illustration showing an aircraft incorporating an exemplary embodiment of an emergency air-to-ground information transmission system (EAGITS) and an exemplary ground support configuration therefor in accordance with aspects of the present invention.

With reference to FIG. 1, an aircraft 10 has a cockpit 12 as is commonly known, and is equipped with a FR 20 in the usual manner, optionally including a CVR 22 and/or a FDR 24. While shown here as an airplane, other aircraft 10 are contemplated, e.g., helicopters, airships, etc. The aircraft 10 is also equipped with an EAGITS 100 including an antenna 102. As shown, the FR 20 is arranged within the tail end of the aircraft 10, the core of the EAGITS 100 is located in the nose end of the aircraft 10 along with other aviation electronics, and the antenna 102 is attached to the outside and underside of the aircraft 10. However, any one or more of these elements or parts thereof may be otherwise arranged or located within or on the aircraft 10.

Figure 2:
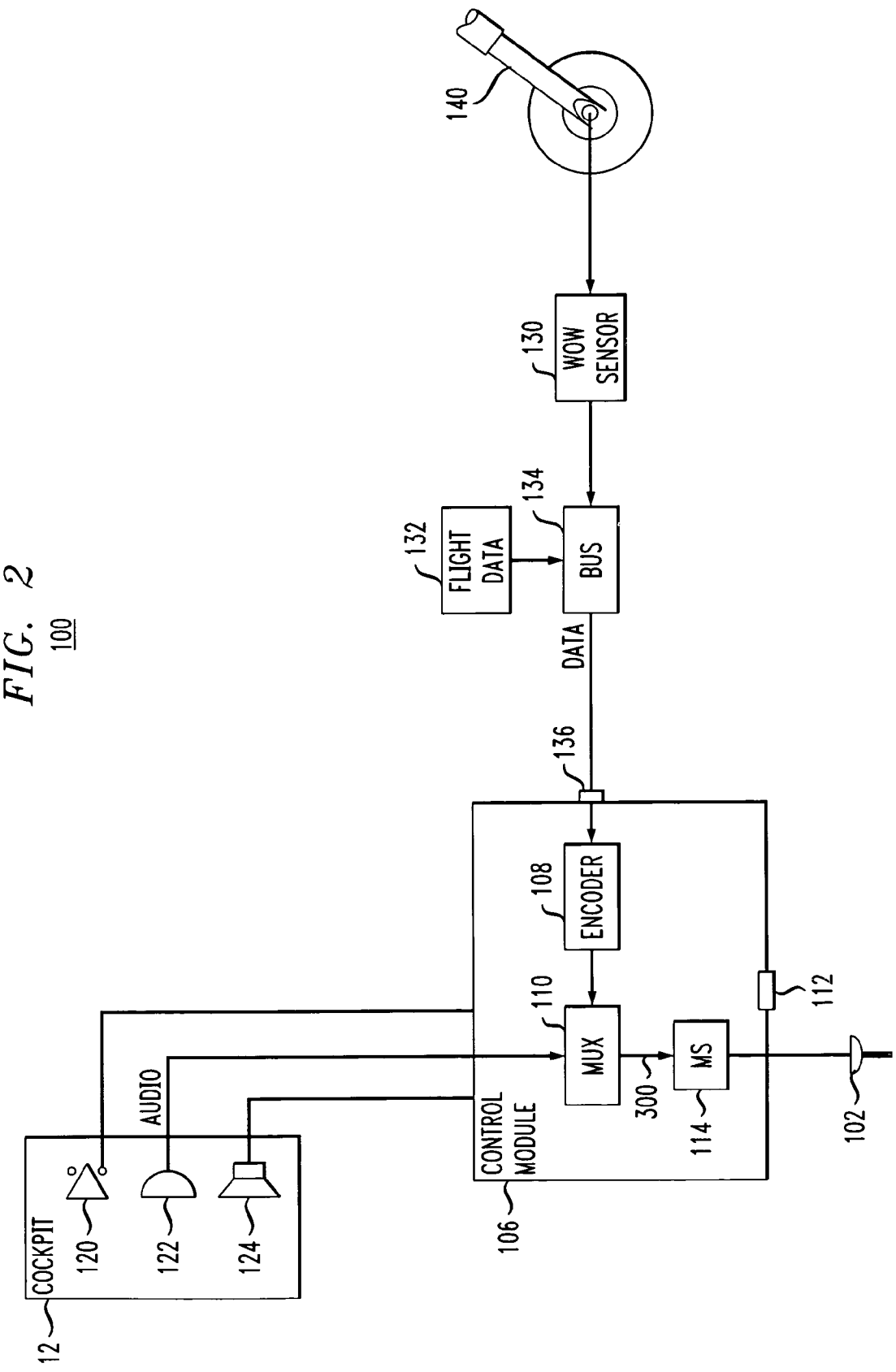
FIG. 2 is a schematic block diagram showing details of the EAGITS in FIG. 1.

With added reference to FIG. 2, the EAGITS 100 includes at its core a control module 106 having an encoder 108, a multiplexer (MUX) 110, an access port 112, and a mobile station 114 connected to the antenna 102. The control module 106 is optionally a line replaceable unit (LRU) containing electronics, such as a microprocessor, central processing unit (CPU), etc., which control and/or regulate operation of the EAGITS 100. The access port 112 provides an individual (e.g., a technician) access to the control module 106 for maintenance, testing, programming and/or other desired manipulations of the control module 106 and/or the EAGITS 100. The antenna 102 and mobile station 114 are cellular devices or the like operative to communicate over a wireless telecommunications network, such as a cellular telecommunications network (CTN) 200 including one or more base stations. The mobile station 114 is suitably a transmit only station or may be a transmit and receive station.

As shown, an activation control 120, an audio detector 122, and an activation indicator 124 are located in the cockpit 12 and wired to or otherwise in operative communication with the control module 106. The activation control 120 is suitably a manual control incorporated in the cockpit's control and/or instrument panel. Operation of the activation control 120 allows an individual (e.g., a pilot or other flight crew member) to manually activate the EAGITS 100. In particular, operation of the control 120 sends an activation signal therefrom to the control module 106 which then activates the EAGITS 100.

To restrict unwanted deactivation, once the EAGITS 100 is manually activated by the control 120, further operation of the control 120 will not deactivate the EAGITS 100. That is to say, once an activation signal is received by the module 106 from the control 120, then further signals therefrom are ignored or disregarded by the module 106 until the EAGITS 100 is reset. Accordingly, for example, if the pilot were to manually activate the EAGITS 100 with the control 120 in response to a hijacking, the hijacker could not then deactivate the EAGITS 100 by further operation of the control 120.

Additionally, the control 120 is advantageously a "normally closed type" switch. That is to say, in its otherwise normal position, the switch circuit is closed and the EAGITS 100 is not activated. When the switch is thrown or operated, the circuit is opened and the EAGITS 100 is thereby activated. In this manner, should the switch be damaged, destroyed, or otherwise should there be an attempt to disable the switch, any of which result in the opening of the circuit, then the EAGITS 100 would be activated. Alternately, the control 120 is a voice recognition circuit (VRC) responsive to one or more selected voices or audible commands or key words or sounds, in which case the VRC is optionally wired to or otherwise in operative communication with the audio detector 122.

The audio detector 122 is suitably a microphone, or other audio receiver, or a plurality thereof, arranged in the cockpit 12 and/or flight crew headsets, so as to pick-up or detect the voices of flight crew, sounds or other audio information in the cockpit 12, and/or the voices of others in audio communication with the cockpit 12. The detected audio information or signal is transmitted from the detector 122 to the control module 106.

The indicator 124 is suitably incorporated in the cockpit's control and/or instrument panel and/or the flight crew headsets. In response to a signal received from the control module 106, the indicator 124 provides a humanly perceivable indication of whether or not the EAGTIS 100 is in an activated state. As shown, the indicator 124 is a speaker which provides an audible indication of the EAGITS' state (e.g., a warning buzzer or siren may sound when the EAGITS 100 activated), however, the indicator 124 may also provide a visual indication of the EAGITS' state (e.g., the indicator 124 may be a warning light or the like which illuminates or flashes when the EAGITS 100 is activated), or the indicator 124 may provide a combination of audible and visual indications.

The module 106 is also wired to or otherwise in operative communication with a weight-on-wheels (WOW) sensor 130 and the aircraft's flight data 132, for example, via the aircraft's aeronautical radio incorporated (ARINC) data bus 134 or otherwise. As shown, the module 106 bridges or otherwise makes connection with the bus 134 through connector 136. The bus 134 carries signals corresponding to the aircraft's flight data 132, and signals from the WOW sensor 130, which are in turn accessed therefrom by the module 106.

The WOW sensor 130 detects when the aircraft 10 is resting on or otherwise supported by its wheels or other landing gear 140, and outputs a signal in response thereto. In response to the output signal from the sensor 130, the module 106 deactivates and/or resets the EAGITS 100. For example, if the EAGITS 100 is activated while the aircraft 10 is in flight, it will remain activated until the aircraft 10 lands and the sensor 130 detects that the aircraft 10 is resting on otherwise supported by its wheels or other landing gear 140, at which point the module 106 upon receiving the corresponding signal from the sensor 130 automatically deactivates and/or resets the EAGITS 100. Optionally, for on ground testing, the access port 112 may be used to override or provide a substitute signal for the sensor's output. Additionally, a similar override may be provided in the cockpit 12 or elsewhere on the aircraft 10 to selectively disable the automatic deactivation of the EAGITS 100 upon landing. Also, prior to take off or at other times when the aircraft 10 is grounded, it may be advantageous to not have the EAGITS 100 automatically deactivated in response to the corresponding signal from the sensor 130. Accordingly, upon receiving an activation signal while simultaneously receiving a signal from the sensor 130 that indicates that the aircraft 10 is resting on or being supported by its landing gear 140, the module 106 is advantageously programmed to ignore or disregard the signal from the sensor 130 or otherwise not deactivate the EAGITS 100.

Alternately, the EAGITS 100 is not automatically deactivated and/or reset in response to a signal from sensor 130 indicating the aircraft 10 is on the ground, but rather, it is manually deactivated and/or reset via the access port 112 which is only practically accessible while the aircraft 10 is on the ground. To further protect against unauthorized access, a password or other like security may be employed when accessing the EAGITS 100 via port 112. Optionally, if the aircraft takes off with a disarmed EAGITS 100, it is automatically reset to an armed state in response to a signal from sensor 130 indicating the aircraft 10 is off the ground.

In addition to the manual activation of the EAGITS 100 by operation of the control 120, the module 106 is optionally programmed to automatically activate the EAGITS 100 is response to receiving flight data 132 indicative of an emergency or other determined condition, e.g., a position, altitude, attitude, trajectory, air speed, yaw, lift, decent or climb rate, acceleration, fuel level and/or consumption, flap and/or throttle positions, flight and/or other instrument readings, engine function data, cabin pressure or some combination thereof which is inappropriate for the aircraft 10, adverse weather conditions, etc.

Alternately, or in addition to the WOW sensor 130, other options are employed to determine when the aircraft 10 has landed or is otherwise not airborne, i.e., the aircraft 10 is on the ground. The aircraft's state in this regard is optionally determined from the flight data 132. For example, when the aircraft's altitude is substantially stable and its airspeed is zero or less than some minimum that would keep the aircraft aloft, it may be assumed then that the aircraft 10 is on the ground.

With particular reference again to FIG. 1, the operation of the EAGITS 100 is now described by way of example. Upon activation, the EAGITS 100 places a call to a designated or otherwise determined phone number via the mobile station 114 (shown in FIG. 2). The call is received over an air interface channel 150 by a base station 202 of the CTN 200. The received call is routed through the CTN 200 and/or any intervening public switched telephone network (PSTN) or other network to a ground facility 210 where it is received by a receiving server (RS) 212 corresponding to the phone number called. Once the call is established between the mobile station 114 and the RS 212, the RS 212 sends a steady tone or other signal back to the mobile station 114. If this steady tone or signal is lost, the EAGITS 100 assumes the call has been dropped, and continues attempts to reestablish the call and/or employs one or more alternate phone numbers until successful.

With particular reference again to FIG. 2, having established the call, the module 106 acquires the audio signal from the audio detector 122 and the flight data 132 or some portion thereof. For example, the acquired flight data is acquired by the module 106 as 32 bit data from the bus 134 in self-clocking fashion. The acquired flight data is encoded by encoder 108. The MUX 110 interleaves or otherwise combines the encoded flight data with audio signal to produce an output signal, for example, the output signal 300 as shown in FIG. 3. Optionally, a buffer is used to match the speed of the bus 134 with that of the channel used to acquire the audio signal. The signal 300 is transmitted via the established call to the RS 212.

The encoder 108 encodes the acquired flight data into dual tone multi-frequency (DTMF) pairs defining, for the data being transmitted, logic 0 (e.g., shown in FIG. 3 as region 302 of the combined output signal 300 from MUX 110) and logic 1 (e.g., shown in FIG. 3 as region 304 of the combined output signal 300 from MUX 110). While other encoding options are contemplated, DTMF encoding is advantageous insomuch as DTMF is designed to avoid false signals that can be caused by human voices. Accordingly, the DTMF encoded flight data can be reliably combined with or otherwise transmitted along with the audio signal.

Optionally, all the flight data 132 is acquired, encoded and transmitted via the established call. However, due to limited bandwidth of the air interface channel 150, it can be advantageous to use a smaller subset of the flight data including selected data that is most relevant for tracking the aircraft's flight, e.g., the aircraft's tail number, position, altitude and trajectory.

The signal 300 is received and process, substantially in real time, by the RS 212. The received signal 300 is first processed by a splitter or demultiplexer (DEMUX) 214 which divides or separates the audio signal into an audio channel and the encoded flight data into a data channel. The audio signal is sent to a speaker 216 or other like output device for live playback, optionally, after suitable smoothing or filtering. The encoded flight data is sent to a decoder 218 where it is decoded and/or formatted for display on a video monitor 220 or other like output device. Advantageously, the decoded flight data is formatted to provide a live display that tracks the flight of the aircraft 10, e.g., in similar fashion to an air traffic control monitor or radar screen.

The received audio signal and decoded flight data are also sent to a storage device 222 where they are recorded and/or saved. The storage device 222 is optionally an electromagnetic storage device (e.g., a tape, disk, hard drive or the like), an optical storage device (e.g., an optical drive), a memory, or any other suitable data storage device. Optionally, while shown as a single device, separate storage devices may be employed for each signal being recorded and/or saved. Advantageously, one or more of the received encoded data and/or the raw signal 300 are also sent to the storage device 222 where they are likewise recorded and/or saved. The signals sent to the storage device 222 are time stamped and synchronized to one another. Synchronization is optionally achieved with reference to the raw signal 300.

Advantageously, as compared to conventional FRs which may support only a limited amount of recording time, because the storage device 222 is not constrained by being onboard the aircraft 10 or contained in a secured black box with limited physical space, considerably more recording time is achievable. The storage device 222 may be advantageously sized so as to be capable of recording audio information and flight data for the entire duration of a flight. In a suitable embodiment, as long as the call remains established, the signal 300 is received and processed by the RS 212. Once the EAGITS 100 is deactivated, the call is terminated.

Advantageously, the EAGITS 100 and ground support configuration therefor (including elements identified by reference numbers in the two hundreds) optionally incorporate and/or inherently possess certain security and/or privacy features. For example, as a first line of defense, the phone number for the ES 212 is unpublished or otherwise not widely known or disseminated. Additionally, when a call is established between the mobile station 114 and the RS 212, the call is authenticated to verify that it is a real call, as opposed to a fraudulent call placed by a hacker or other unauthorized individual. What is commonly known as an authentication, authorization and accounting (AAA) server is optionally employed to verify calls, or alternately similar functions thereof are incorporated in the RS 212. Caller identification (ID) may also be employed to ensure that received calls are coming from a mobile station 114 having a phone number that corresponds to a registered or otherwise known EAGITS 100.

In a suitable embodiment, the EAGITS 100 has stored therein or is programmed with a secret unique identifier recognizable by the RS 212. This identifier is then transmitted from the EAGITS 100 to RS 212 either when the call is established or along with the flight data in the signal 300. Via the identifier, the RS 212 is able to distinguish real calls from fraudulent calls. Further, it is contemplated that known data encryption and/or signal scrambling techniques may be employed to further bolster security and/or privacy. Optionally, the air interface channel 150 to the base station 202 within the CTN 200 is a dedicated channel which is only accessible by the EAGITS 100.

Security and/or privacy is further enhanced insomuch as the signal 300 is transmitted via an established call within the CTN 200. That is to say, the signal 300 is not broadcast out and/or received over an otherwise open frequency or channel as may be the case with other forms of radio and/or wireless communication.

As a further measure to verify call authenticity, the ground facility 210 has the ability to contact a third party 230 having knowledge of the aircraft's position and/or flight plan. The ground facility 210 can then check the received flight data against the third party's information. For example, the third party may be an air traffic control center which can locate the aircraft 10 via radar or otherwise. Alternately, the third party 230 may be an airline, airport, the Federal Aviation Administration (FAA) or other entity having filed or recorded therewith the flight plan of the aircraft 10.

It is also contemplated that the RS 212 is arranged so that the third party 230 (be they one of the aforementioned exemplary third parties or some other third party) has the option of accessing the RS 212 to retrieve the signal 300 in its raw state and/or post-processing by the RS 212. For example, the third party 230 makes a dial-up connection to the RS 212 and bridges the call to retrieve the signal 300. In the case of retrieval of the raw signal 300, the third party 230 is equipped to conduct the same processing functions as the RS 212 to extract the audio signal and flight data therefrom. It is also contemplated that the third party 230 and ground facility 210 are in fact one in the same. That is to say, the ground facility 210 may constitute an air traffic control center, an airline, an airport, the FAA or the like.

While a combined signal 300, transmitted via a single call, over a single channel 150, has been shown, it is also contemplated that optionally multiple separate calls are established over multiple separate channels 150, and that optionally the transmitted flight data and audio signal are not combined, but rather they are transmitted separately via the multiple separate calls/channels. Each of the aforementioned options can have certain advantages over the other. For example, the combined signal approach advantageously conserves bandwidth and provides a further option for verifying call authenticity insomuch as the flight data and audio signal are more closely tied to one another. On the other hand, the separate approach advantageously provides more overall bandwidth for transmitting information, allows for the omission of the MUX 110 and DEMUX 214, and may allow for a greater range of flight data encoding options, including optionally using no encoding, thereby also permitting the optional omission of the encoder 108 and decoder 218. In the multi-call/channel option, the security measures employed optionally include using the aforementioned secret unique identifier in connection with each of the calls/channels.

Additionally, while the EAGITS 100 is shown as a supplement to the FR 20, nevertheless, it is also contemplated that the FR 20 may optionally be omitted with the EAGITS 100 being substituted therefor. Again, each of the aforementioned options can have certain advantages over the other. For example, it is appreciated that cellular network coverage may not be uniform. In particular, cellular coverage may be limited to particular geographic locations and/or may not reach higher altitudes. The EAGITS 100 therefore may be less reliable in these areas, in which case, including the FR 20 is advantageous to the extent that the FR 20 may then be serving as the sole recording device. However, it is also appreciated that many undesirable events, for which it is desirable to have audio and flight data available, occur at lower altitudes near metropolitan areas (e.g., during take-off and landing at airports) where cellular coverage is generally good. In these situations then, the EAGITS 100 is likely to be substantially reliable, and the FR 20 is a redundant system that could (absent other considerations) advantageously be omitted, e.g., to simplify the aircraft's electronics, realize a cost savings in aircraft assembly, etc.

For purposes of simplicity and clarity herein, only one aircraft 10 with one EAGITS 100 has been shown. It is to be appreciated, however, that multiple aircraft such as described are equipped in the fashion described with multiple EAGITS' such as described, all or some portion thereof operating or otherwise in use substantially at the same time.

The ground support configuration as shown optionally supports and/or administers its functionality to multiple EAGITS'. That is to say, a single ground facility 210 is equipped with sufficient call switching and/or handling resources to simultaneously and/or consecutively receive multiple EAGITS calls from a plurality of different aircraft. Suitably, a variety of known call switching and/or handling techniques and/or systems may be used to handle the EAGITS call volume. The individual aircraft are identified by their respective tails numbers, and/or the individual EAGITS are identified by their respective secret unique identifiers, or optionally via caller ID.

It is further contemplated that multiple ground facilities equipped and/or arranged in similar fashion to the one described may be employed in the ground support configuration. Additionally, multiple RS' equipped and/or arranged in similar fashion to the one described are optionally distributed in one or more ground facilities.

In a suitable embodiment, each call reception site (a "site" representing an individual RS and/or an individual ground facility) optionally has a unique phone number or a bank of unique phone numbers separately assigned thereto. Each aircraft or each airline is then likewise distinctly assigned to one or more sites. In corresponding fashion, each aircraft's EAGITS is supplied with one or more uniquely designated phone numbers to call such that the site reached is distinctly assigned to that aircraft and/or distinctly assigned to that aircraft's airline. In this manner, possible issues over privacy are avoided.

Optionally, when initiating calls, the respective EAGITS' are programmed to call a designated phone number or alternately a determined phone number, e.g., a phone number selected from a list thereof. The selection criteria or process may be random, provide for a cyclical or other patterned progression through the list, or be based upon one or more factors or detected conditions, e.g., the aircraft's position, the availability and/or location of ground support resources, etc. The designated phone number, phone number list, selection criteria or process, factors and/or detected conditions employed by each respective EAGITS are either preprogrammed or may be dynamically updated. For example, the dynamic updating may be internally achieved independently by the EAGITS or with the assistance of other onboard instrumentation or data. In another suitable embodiment, the dynamic updating may be achieved by one or more sites periodically uploading programming instructions or commands or other data to respective EAGITS'. In this manner, rather than having an EAGITS call a fixed predetermined site or subset of sites, the dynamic updating allows an EAGITS' calling to be dynamically adjusted or tailored to reach a desired site or subset of sites that may be dynamically variable, e.g., the nearest site capable of receiving and/or handling the call.

It is to be appreciated that particular elements or components described herein may have their functionality suitably implemented via hardware, software or a combination of hardware and software configurations. Additionally, it is to be appreciated that certain elements described herein as incorporated together may under suitable circumstances be stand alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described herein as distinct from one another may be physically or functionally combined where appropriate.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for preserving information from an airborne aircraft, said method comprising:
   establishing a call from the aircraft to a ground support facility over a wireless telecommunications network;
   obtaining information from the aircraft, said information including at least one of voice data and flight data;
   transmitting the obtained information via the call from the aircraft to the ground support facility; and,
   determining if the aircraft has landed, and in response thereto automatically terminating the call, wherein the determining includes: sensing if the aircraft's landing gear is supporting the aircraft.

2. A system for preserving information from an airborne aircraft, said system comprising:
   control means for controlling the system, said control means activating the system in response to an activation signal;
   detecting means for monitoring sounds within the aircraft and generating an audio signal in response thereto;
   acquiring means for obtaining flight data from the aircraft;
   an encoder for encoding the flight data;
   combining means for combining the audio signal and encoded flight data together with one another to generate a combined output signal;
   communication means for establishing a connection with a ground support facility over wireless telecommunications network when the system is activated, said combined output signal being transmitted to the ground support facility via the established connection; and,
   automatically, wherein the determining means includes a sensor that senses when the aircraft is resting on its landing gear.

3. The system of claim 2, further comprising:
   receiving means for receiving the combined output signal at the ground support facility via the established connection;
   splitting means for dividing the received output signal into the audio signal and the encoded flight data;
   a decoder for decoding the encoded flight data; and,
   a storage device on which is recorded at least one of the received output signal, the audio signal, the encoded flight data, and the decoded flight data.

4. The system of claim 2, wherein said wireless telecommunications network is a cellular network, the communication means is a mobile station of the cellular network, and said connection is a call over the cellular network.

5. The system of claim 2, wherein the encoder encodes the flight data into dual tone multi-frequency pairs defining binary values representative of the flight data.

6. The system of claim 2, wherein the detecting means is a microphone arranged within a cockpit of the aircraft.

7. The system of claim 2, further comprising activation means for generating the activation signal.

8. The system of claim 7, wherein the activation means is a manually operated control arranged in a cockpit of the aircraft.

9. The system of claim 7, wherein the activation means includes a voice recognition device responsive to verbalized input.

* * * * *